(12) United States Patent
Keller et al.

(10) Patent No.: US 8,847,957 B1
(45) Date of Patent: Sep. 30, 2014

(54) DIVIDE-AND-CONQUER SYSTEM, METHOD, AND COMPUTER PROGRAM PRODUCT FOR PROVIDING PHOTON MAPPING

(75) Inventors: Alexander Keller, Berlin (DE); Marc Droske, Berlin (DE); Leonhard Grunschloss, Wellington (NZ)

(73) Assignee: NVIDIA Corporation, Santa Clara, CA (US)

( * ) Notice: Subject to any disclaimer, the term of this patent is extended or adjusted under 35 U.S.C. 154(b) by 126 days.

(21) Appl. No.: 13/253,897

(22) Filed: Oct. 5, 2011

(51) Int. Cl.
*G06T 15/60* (2006.01)
*G06T 17/00* (2006.01)
*G06T 17/20* (2006.01)
*G06T 15/30* (2011.01)

(52) U.S. Cl.
USPC .......................... 345/426; 345/423; 345/420

(58) Field of Classification Search
None
See application file for complete search history.

(56) References Cited

U.S. PATENT DOCUMENTS

| | | | |
|---|---|---|---|
| 6,911,976 B2* | 6/2005 | Abramov | 345/426 |
| 2005/0278406 A1* | 12/2005 | Keller | 708/444 |
| 2006/0066616 A1* | 3/2006 | Sevastianov et al. | 345/426 |
| 2007/0206008 A1* | 9/2007 | Kaufman et al. | 345/424 |
| 2008/0231633 A1* | 9/2008 | Keller et al. | 345/426 |
| 2009/0141026 A1* | 6/2009 | Raab et al. | 345/424 |
| 2009/0167763 A1* | 7/2009 | Waechter et al. | 345/426 |
| 2010/0079452 A1* | 4/2010 | Zhou et al. | 345/420 |
| 2010/0332523 A1* | 12/2010 | Peterson et al. | 707/769 |
| 2012/0038643 A1 | 2/2012 | Keller et al. | |
| 2013/0044117 A1* | 2/2013 | Mejdrich et al. | 345/501 |

OTHER PUBLICATIONS

Veach, E., "Robust Monte Carlo Methods for Light Transport Simulation," Dissertation, Dec. 1997, pp. 1-406.
U.S. Appl. No. 12/856,529, filed Aug. 13, 2010.
Faure, H., "Discrépance de suites associées à un systéme de numération (en dimension s)," Acta Arithmetica, XLI, 1982, pp. 337-351.
Hickernell, F. J. et al., "Extensible Lattice Sequences for Quasi-Monte Carlo Quadrature," SIAM Journal on Scientific Computing, 2000, pp. 1-22, vol. 22, No. 3.
Hachisuka, T. et al., "Stochastic Progressive Photon Mapping," Proceedings of ACM SIGGRAPH Asia 2009, Dec. 2009, pp. 1-8.
Hachisuka, T. et al.; "Progressive Photon Mapping," Proceedings of ACM SIGGRAPH Asia 2008,Dec. 2008, pp. 1-8, vol. 27, No. 5.
Jensen, H. W., "Realistic Image Synthesis Using Photon Mapping," 2001, A K Peters, pp. 1-181.
Keller, A., "Strictly Deterministic Sampling Methods in Computer Graphics," Feb. 8, 2001, pp. 1-39.
Keller, A., "Myths of Computer Graphics," Monte Carlo and Quasi-Monte Carlo Methods 2004, 2006, pp. 217-243.

(Continued)

*Primary Examiner* — Joni Richer
*Assistant Examiner* — Yi Wang
(74) *Attorney, Agent, or Firm* — Zilka-Kotab, PC

(57) ABSTRACT

A system, method, and computer program product are provided for hierarchical photon mapping. In use, photons and query locations are generated. Additionally, a bounding volume of the query locations is determined. Further, a set of the photons inside of the bounding volume is determined. It is then determined whether the set of photons and query locations meet predetermined criteria. If it is determined that the set of photons and query locations do not meet the predetermined criteria, the query locations are partitioned, and for each set of the query locations resulting from the partitioning, the above described steps for the hierarchical photon mapping are repeated. Once it is determined that the set of photons and query locations meet the predetermined criteria, a contribution of the set of photons to the query locations is computed.

15 Claims, 3 Drawing Sheets

(56) References Cited

OTHER PUBLICATIONS

Kollig, T. et al., "Efficient Bidirectional Path Tracing by Randomized Quasi-Monte Carlo Integration," and Quasi-Monte Carlo Methods 2000, 2002, pp. 290-305.

Niederreiter, H., "Random Number Generation and Quasi-Monte Carlo Methods," Society for Industrial and Applied Mathematics (SIAM), 1992, pp. 1-77.

Shirley, P. "Realistic Ray Tracing," A K Peters, Ltd., 2000, pp. ix-xiii, 1-165.

Silverman, B. W., "Density Estimation for Statistics and Data Analysis," Monographics on Statistics and Applied Probability, 1986, pp. 1-22.

Sobol, I. M., "Uniformly Distributed Sequences with an Additional Uniform Property," Zh. vychisl. Mat. mat. Fiz.,1976, pp. 236-242, vol. 16, No. 5.

Wachter, C. A., "Quasi-Monte Carlo Light Transport Simulation by Efficient Ray Tracing," Dissertation, 2007, pp. 1-136.

Wozniakowski, H., "Average Case Complexity of Multivariate Integration," Bulletin of the American Mathematical Society, Jan. 1991, pp. 185-194, vol. 24, No. 1.

Aila, T. et al., "Understanding the Efficiency of Ray Traversal on GPUs," 2009, pp. 1-5.

Alcantara, D. A. et al., "Real-Time Parallel Hashing on the GPU," 2009, pp. 1-9.

Bentley, J. L. et al., "Data Structures for Range Searching," Computing Surveys, Dec. 1979, vol. 11, No. 4, pp. 397-409.

Blelloch, G., "Prefix Sums and Their Applications," Carnegie Mellon University School of Computer Science, Technical Report CMU-CS-90-190, Nov. 1990, pp. 1-23.

Choi, B. et al., "Parallel SAH k-D Tree Construction for Fast Dynamic Scene Ray Tracing," Technical Report, Sep. 22, 2009, pp. 1-9.

Cederman, D. et al., "A Practical Quicksort Algorithm for Graphics Processors," Technical Report No. 2008-01, 2008, pp. 1-17.

de Berg, M. et al., "Computational Geometry: Algorithms and Applications," Springer, 2008, Third Edition, pp. 1-386.

Gunther, J. et al., "Realtime Ray Tracing on GPU with BVH-based Packet Traversal," To appear in the IEEE/Eurographics Symposium on Interactive Ray Tracing 2007, 2007, pp. 1-6.

Hunt, W. et al., "Fast kd-tree Construction with an Adaptive Error-Bounded Heuristic," 2006, pp. 1-8.

Horn, D. R. et al., "Interactive k-D Tree GPU Raytracing," ACM, Proceedings of the 2007 Symposium on Interactive 3D Graphics and Games, 2007, pp. 167-174.

Iray, Interactive Photorealistic Rendering Technology, mental images GmbH, Nov. 15, 2010, retrieved from http://web.archive.org/web/20101115074402/http://www.mentalimages.com/products/iray.html.

Keller, A. et al., "Quasi-Monte Carlo Progressive Photon Mapping," 2010, pp. 1-11.

Lauterbach, C. et al., "Fast BVH Construction on GPUs," Eurographics 2009, 2009, vol. 28, No. 2, pp. 1-10.

Lindholm, E. et al., "NVIDIA Tesla: A Unified Graphics and Computing Architecture," IEEE Micro, Mar.-Apr. 2008, pp. 39-55.

Lafortune, E. P. et al., "Bi-Directional Path Tracing," Proceedings of Compugraphics '93, Dec. 1993, pp. 145-153.

Nickolls, J. et al., "Scalable Parallel Programming with CUDA," ACM Queue, Mar.-Apr., 2008, pp. 42-53.

NVIDIA, "CUDA C Best Practices Guide," DG-05603-001_v4.0, May 2011, pp. 1-70.

NVIDIA, Optix, Jun. 6, 2011, http://web.archive.org/web/20110606070959/http://www.nvidia.com/object/optix.html.

Sengupta, S. et al., "Scan Primitives for GPU Computing," Graphics Hardware (2007), ACM, Aug. 4-5, 2007, pp. 97-106.

Spencer, B. et al., "Hierarchical Photon Mapping," IEEE Transactions on Visualization and Computer Graphics, Jan./Feb. 2009, vol. 15, No. 1, pp. 49-61.

Vaidya, P. M., "An O(n log n) Algorithm for the All-Nearest-Neighbors Problem," Discrete Comput Geom 4, 1989, pp. 101-115.

Wald, I. et al., "Balancing Considered Harmful—Faster Photon Mapping using the Voxel Volume Heuristic," Eurographics 2004, 2004, vol. 23, No. 3, pp. 1-9.

Wachter, C. et al., "Terminating Spatial Hierarchies by A Priori Bounding Memory," Technical Report, 2007, pp. 1-15.

Wang, R. et al., "An Efficient GPU-based Approach for Interactive Global Illumination," 2009, pp. 1-8.

Zomorodian, A. et al., "Fast Software for Box Intersections," International Journal of Computational Geometry & Applications, 2000, pp. 1-30.

Zhou, K. et al., "Real-Time KD-Tree Construction on Graphics Hardware," 2008, pp. 1-11.

Schjoth, L., "Diffusion based Photon Mapping," IT University Copenhagen, 2005, pp. 1-75.

Non-Final Office Action from U.S. Appl. No. 12/856,529, dated Sep. 13, 2012.

Final Office Action from U.S. Appl. No. 12/856,529, dated Jan. 23, 2013.

Advisory Action from U.S. Appl. No. 12/856,529, dated Apr. 8, 2013.

Zurek, Thomas., "Brute Force Nested-Loops Joins," Jan. 2001, retrieved from http://www.dcs.ed.ac.uk/home/tz/phd/thesis/node19.htm.

Non-Final Office Action from U.S. Appl. No. 12/856,529, dated Aug. 28, 2013.

Final Office Action from U.S. Appl. No. 12/856,529, dated Jan. 27, 2014.

\* cited by examiner

DIVIDE-AND-CONQUER SYSTEM, METHOD, AND COMPUTER PROGRAM PRODUCT FOR PROVIDING PHOTON MAPPING

FIELD OF THE INVENTION

The present invention relates to graphics processing, and more particularly to light transport simulation.

BACKGROUND

In graphics processing, light transport simulation is utilized to generate graphical images in which light is being transported for example via reflective or refractive surfaces. For example, such light transport may include light entering a car through a window, hitting the interior, and being transported back through the window to an outside observer, or the observation of a room through a mirror, where substantial illumination of the room is due to a small light source through the mirror.

In principle, light transport simulations sum up the contributions of all transport paths, which connect light sources with sensors. However, where path generation is generally efficient, traditional techniques for processing query locations and associated photons have exhibited various limitations. For example, single queries are generally utilized to separately process each query location.

There is thus a need for addressing these and/or other issues associated with the prior art.

SUMMARY

A system, method, and computer program product are provided for hierarchical photon mapping. In use, photons and query locations are generated. Additionally, a bounding volume of the query locations is determined. Further, a set of the photons inside of the bounding volume is determined. It is then determined whether the set of photons and query locations meet predetermined criteria. If it is determined that the set of photons and query locations do not meet the predetermined criteria, the query locations are partitioned, and for each set of the query locations resulting from the partitioning, the above described steps for the hierarchical photon mapping are repeated. Once it is determined that the set of photons and query locations meet the predetermined criteria, a contribution of the set of photons to the query locations is computed.

DETAILED DESCRIPTION

Figure 1:
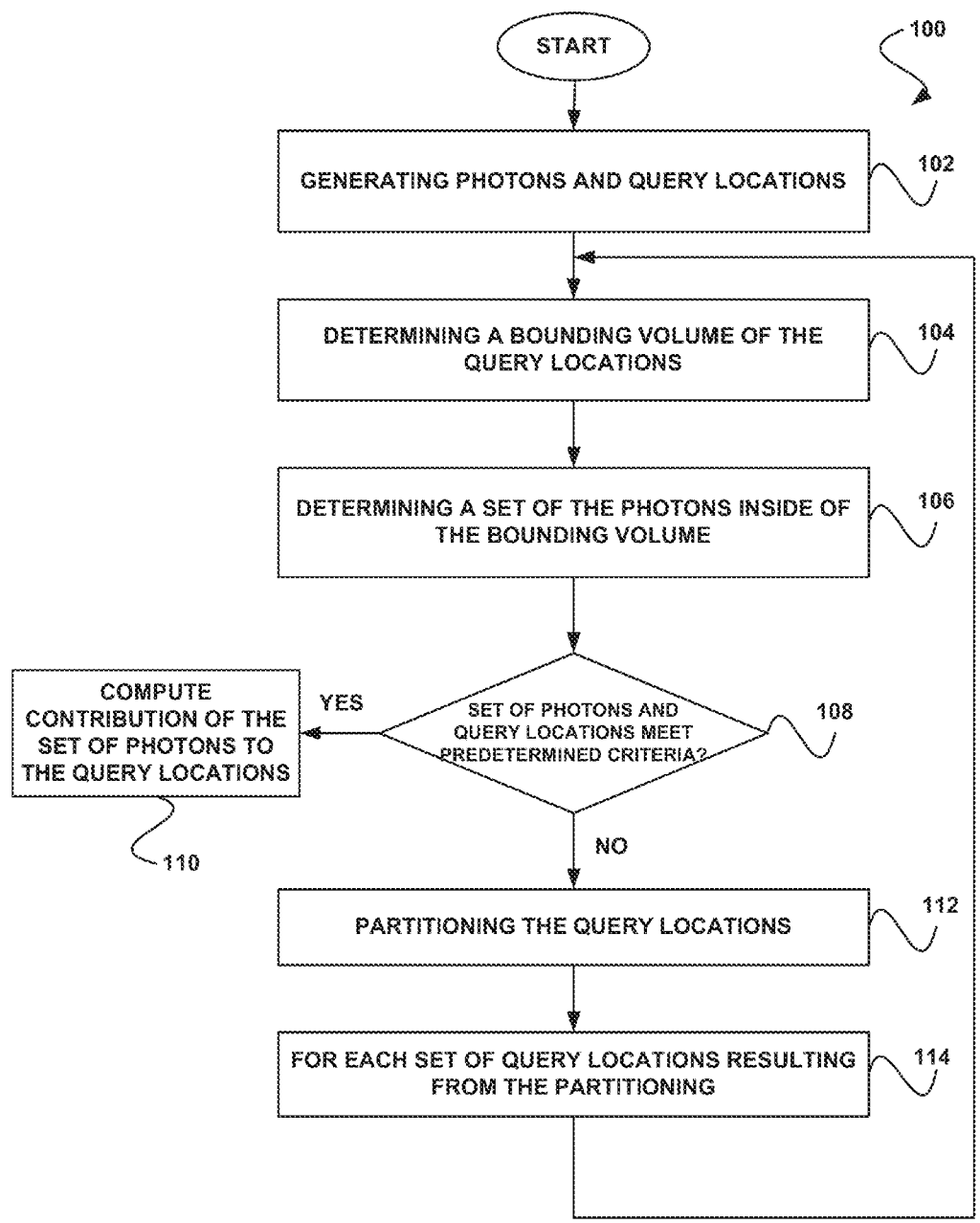
FIG. 1 illustrates a method for providing hierarchical photon mapping, in accordance with one embodiment.

FIG. 1 shows a method 100 for providing divide-and-conquer photon mapping, in accordance with one embodiment. As shown in operation 102, photons and query locations are generated. In the context of the present description, the photons and query locations are associated with light transport simulation, for example the synthesis of a graphical image.

In the present embodiment, the query locations may include any points found by tracing a transport path (e.g. starting from a viewpoint of the graphical image, such as a perspective of a user when viewing the graphical image). For example, at least one transport path may be emitted from a perspective source of the graphical image, which may be a sensor. Each query location may be generated as a result of the transport path being scattered across (e.g. intersecting) at least one surface (e.g. reflective surface) of the graphical scene description. Also in the present embodiment, the photons may be generated by emitting the photons from a light source to be traced along paths through the graphical scene description.

Additionally, as shown in operation 104, a bounding volume of the query locations is determined. The bounding volume may include any set that contains all of the query locations (e.g. which encompasses the query locations). In one embodiment, the bounding volume may be an axis-aligned bounding box. Thus, the bounding volume may be of a predetermined shape. Of course, while an axis-aligned bounding box is described above, it should be noted that the bounding volume may include any sized region of any desired shape.

As noted above, a bounding volume of the query locations is determined. For example, the bounding volume may enclose the query locations, such that the query locations may be within (e.g. have a location within) the bounding volume. Thus, each location within the bounding volume intersected by a (e.g. scattered) transport path may be a query location within the bounding volume.

Further, as shown in operation 106, a set of the photons inside of the bounding volume is determined. For example, the photons inside of the bounding volume may include those intersecting a point of the graphical scene description within the bounding volume.

It is then determined in decision 108 whether the set of photons and query locations meet predetermined criteria. The predetermined criteria may include any criterion that is preconfigured for use in determining whether to partition the query locations, as described in more detail below. For example, the predetermined criteria may include a threshold, such as a threshold number of query locations within the bounding volume, a threshold number of photons, a depth of recursion, etc. Of course, however, the predetermined criteria may include any criteria capable of being utilized in conjunction with the set of photons and query locations for determining whether the query locations are to be partitioned, as described below. Such a predetermined criterion may include termination by the depth of recursion.

If it is determined that the set of photons and query locations do not meet the predetermined criteria, the query locations are partitioned, as shown in operation 112. In the present embodiment, partitioning includes dividing or otherwise grouping (e.g. in a predetermined manner) at least a portion of the set of query locations into two or more parts (e.g. subportions). Accordingly, each of the at least two parts may be associated with a different set of query locations. To this end, the predetermined criteria according to which the query locations are partitioned may indicate criteria by which it may be determined that the query locations cannot or should not be further partitioned.

Moreover, for each set of the query locations resulting from the partitioning (operation 114), the method 100 returns to operation 104. Just by way of example, where the predetermined criteria includes a threshold number of the query locations within the bounding volume, the query locations may be recursively partitioned until the number of query locations in a partition resulting from one of the recursive partitionings is below the predetermined threshold. The recursive partitioning may include repeating, at least one time, the partitioning of each of the two or more sub-portions as described by the repetition of operations 104-108. Thus, after each partitioning resulting in at least two sub-partitions, each of such sub-partitions may be further partitioned, and this recursive partitioning may be repeated according to the predetermined criteria.

As an option, the query locations may be partitioned in operation 112 according to a predetermined algorithm. The predetermined algorithm may indicate the predetermined manner in which the query locations are partitioned. For example, the predetermined algorithm may include sorting the query locations by x-axis, y-axis, and z-axis and partitioning the query locations according to a median of the sorted query locations. As another example, the predetermined algorithm may include partitioning the set of query locations in a middle of the bounding volume, or partition of the bounding volume, along a longest side of an axis-aligned bounding box (or partition of the bounding volume). The aforementioned examples of the predetermined algorithm may result in a spatial traversal that approximately enumerates the bounding volume along a z-curve, such that data locality implicitly increases cache performance.

As a further option, the partitioning may include, at least in part, parallel processing. For example, as described in more detail below, each level of partitions generated in a single pass of the recursive partitioning may be processed in parallel (e.g. utilizing multiple processors, etc.). For example, each set of query locations resulting from a single pass of the partitioning of operation 112 may be processed in parallel. Such processing for each set of query locations may include the repetition of operations 104-108. Further, the parallel processing may be achieved by assigning each set of query locations resulting from the partitioning to a different computing unit.

Once it is determined that the set of photons and query locations meet the predetermined criteria, a contribution of the set of photons to the query locations is computed. Note operation 110. Thus, for each resulting partition, a set of photons are determined to be inside of a bounding volume determined for the query locations of the partition, and a contribution to the query locations from the photons in that determined set of photons of the partition is computed.

In one embodiment, computing the contribution may include computing an illumination value for each of the query locations in the bounding volume, using the photons in the set of photons determined for the bounding volume. The illumination value may include a color for the query location. For example, the illumination value may include a color sample for a pixel associated with the query location (e.g. displaying the query location or averaging multiple color samples to compute the pixel color, etc.).

In one embodiment, the illumination value may be computed for the query location by aggregating surface properties (e.g. illumination/radiance values) for each of the photons and algorithmically combining the same with the transport property at the query location. Thus, the illumination value for the query location may be based on illumination values for photons determined to be within the bounding volume of the partition including the query location.

In one embodiment, the role of the set of query locations and the set of photons may be swapped.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Table 1 illustrates one example of an algorithm that may be utilized for providing hierarchical photon mapping, in accordance with the method 100 of FIG. 1. Of course, it should be noted that such algorithm is set forth for illustrative purposes only, and thus should not be construed as limiting in any manner.

TABLE 1

Algorithm 1: Simultaneous hierarchical range search.

Integrate (QueryLocations, Photons)
if QueryLocations ≠0 and Photons ≠0 then
    PhotonsInBBox ← Photons ∩ BBox (QueryLocations) ;
    if PhotonsInBBox then
        if Terminate (QueryLocations, PhotonsInBBox) then
            AddRadiance (QueryLocations, PhotonsInBBox) ;
        else
            (QLoc1, QLoc2) ← Partition (QueryLocations) ;
            Integrate (QLoc1, PhotonsInBBox) ;
            Integrate (QLoc2, PhotonsInBBox) ;
        end
    end
end As noted above with respect to operation 112, parallel processing may optionally be provided with respect to the method 100 of FIG. 1. In particular, parallel processing of the resulting partitions may be provided, as described in the following. For example, a plurality of nodes may be generated, where each node represents a different set of query locations resulting from the partitioning. In one embodiment, each node may store an index interval of query locations included in a bounding volume of the associated set of query locations and an index interval of photons inside of such bounding volume.

The aforementioned parallel processing may utilize such nodes. For example, in parallel, a split plane is determined for each node. The query locations in every node may be sorted, such that a bounding volume of such query locations for each node may be obtained and a split direction axis corresponding to a longest extent of the bounding volume along with its median may be determined.

Each node is split into chunks (i.e. regions, parts, etc.) according to the split plane determined for the node. Thus, the node may be split into at least two regions along the split plane. Each chunk is then assigned to an individual available thread block. This may allow high thread occupancy to be achieved.

To this end, for each chunk, the set of query locations included in such chunk may be assigned to a computing unit (e.g. thread), such that each chunk may have its associated set of query locations assigned to a different computing unit. This may allow the parallel processing to include, for each of the parts, partitioning query locations included in the part and assigning each partition to a separate computing unit.

Photons are then assigned to each query location, using the assigned computing unit. Tables 2-4 illustrate examples of the algorithms which may be used to implement the parallel processing described above. Of course, it should be noted that such algorithms are set forth for illustrative purposes only, and thus should not be construed as limiting in any manner.

TABLE 2

Algorithm 2: Parallel simultaneous hierarchical range search.

Data: Photon positions $P_i \in R^3$, query locations $S_i \in R^3$, radius
 $r \geq 0$.
Result: Set of nodes $\subset N_t$ partitioning sets of query locations and
 each node is referencing all candidate photons.
Sort arrays of query location indices for all three axis
$\overline{S}^k = (s_0^k, \ldots, s_{N_s-1}^k)$ for k = x.y.z. Initialize
$\overline{P} = (0, \ldots, p_{N_p-1})$.
$N_{root} \leftarrow$ initialize query location and photon intervals $[0,N_s)$
 resp. $[0,N_p)$;
$N_{root}$.bbox $\leftarrow$ compute query location AABB;
$N_{active} \leftarrow \{N_{root}\}, N_{leaf} \leftarrow \theta$;
while $N_{active} \neq \theta$ do
| $C_s \leftarrow$ generate query location index chunks for $N_{active}$;
| Compute split cost for all positions in parallel;
| for $N \in N_{active}$ do
| | N.splitplane $\leftarrow$ parallel reduction over candidates:
| end
| SplitQueryLocations ( $N_{active}, C_s, \overline{S}^x, \overline{S}^y, \overline{S}^z$, x);
| SplitQueryLocations ( $N_{active}, C_s, \overline{S}^x, \overline{S}^y, \overline{S}^z$, y);
| SplitQueryLocations ( $N_{active}, C_s, \overline{S}^x, \overline{S}^y, \overline{S}^z$, z);
| for $N \in N_{active}$ do
| | N.bbox $\leftarrow$ tighten AABB;
| end
| $C_p \leftarrow$ generate photon index chunks for $N_{active}$;
| AssignPhotons ( $N_{active}, C_p, \overline{P}$, r);
| $N_{leaf} \leftarrow N_{leaf} \cup (N_{active} \cap N_t)$;
| $N_{active} \leftarrow N_{active} \cap N_t^C$;
| CompactNodes ($N_{active}, \overline{S}^x, \overline{S}^y, \overline{S}^z, \overline{P}$);
end

TABLE 3

Algorithm 3: Partitioning the query locations.

SplitQueryLocations ($N_{active}, C_s, \overline{S}^x, \overline{S}^y, \overline{S}^z$, axis)
$\overline{S}^{temp} \leftarrow \overline{S}^{axis}$;
for $C \in C_s$, (parallel blocks) do
| for $i \in C$. QueryLocationindices do
| | flags[i] $\leftarrow$ test $(S[s_i^{axis}]_{splitAxis} \leq C.splitPos)$;
| end
end
pfx$\leftarrow$prefixsums (flags) ;
for $C \in C_s$ (parallel blocks) do
| [a. b) $\leftarrow$ C.QueryLocationIndices;
| node middle offset m $\leftarrow$ a + pfx[b] – pfx[a];
| for $i \in$ [a. b) (parallel threads) do
| | if flags[i] then
| | | t $\leftarrow$ a + pfx[i] – pfx[a];
| | else
| | | t $\leftarrow$ m + (i – a) – (pfx[i] – pfx[a]);
| | end
| | $S^{axis}[t] \leftarrow S^{temp}[i]$;
| end
end It should be noted that the query location array (i.e. index interval) from the node may not necessarily have to be altered for the axis along the split, but for the other directions each entry may optionally be placed into the left or right node, depending on the position relative to the split plane. In such situation, a parallel split primitive using segmented prefix scans may be utilized for the splitting, as described in "Scan Primitives for GPU Computing" by S. Sengupta, M. Harris, Y. Zhang, and J. Owens (*Graphics Hardware* 2007, ACM, 97-106, dated 2007).

This may include creating arrays of flags that indicate whether the query location is left or right of the splitting plane. This array may be created in parallel, for example, using the algorithm of Table 3. As shown in Table 3, the prefix sum at position i of the inverted flag vector is given by i–p̄fx[i], where pfx denotes the prefix sums of the original flag vector (see noted Line 2 of the algorithm in Table 3). The segmented prefix sums may then be deduced within the nodes by elementary difference operations.

TABLE 4

Algorithm 4: Assigning photons to partitions.

AssignPhotons ($N_{active}, C_p, \overline{S}^x, \overline{S}^y, \overline{S}^z$, axis, r)
for $C \in C_p$ (parallel blocks) do
| for $i \in$ C.photonIndices do
| | /* BVH-type split */
| | flagsLeft[i] $\leftarrow$ test($P[p_i] \in$ C.left.bbox + r);
| | flagsRight[i] $\leftarrow$ test($P[p_i] \in$ C.right.bbox + r);
| end
end
pfxLeft$\leftarrow$prefixsums (flagsLeft) ;
pfxRight$\leftarrow$prefixsums (flagsRight) ;
for $C \in C_p$ (parallel blocks) do
| [a.b) $\leftarrow$ C.photonIndices;
| left offset $k_{left} \leftarrow$ pfxLeft[a] + pfxRight[a];
| middle offset $k_{middle} \leftarrow k_{left}$ + pfxLeft[b] – pfxLeft[a];
| for $i \in$ C.photonIndices do
| | /* move photons to left and/or right
| | */
| | if flagsLeft[i] then
| | | t $\leftarrow k_{left}$ + pfxLeft[i] – pfxLeft[a];
| | | $P[t] \leftarrow P^{temp}[i]$;
| | end
| | if flagsRight[i] then
| | | t $\leftarrow k_{middle}$ + pfxRight[i] – pfxRight[a];
| | | $P[t] \leftarrow P^{temp}[i]$;
| | end
| end
end The split procedure for query locations described above can be performed in place, because since they are represented by points, the nodes represent a partition of all query locations on each level of the partitioning hierarchy. Since the photons may be contained in multiple bounding boxes surrounding the query locations, and therefore on the other side of the split plane, all photons intersecting the query location box may be placed in the respective child node (see the algorithm of Table 4). This process may dynamically grow the length d of the photon index arrays, especially for large radii, which may be mitigated by allowing for large leaf sizes in order to benefit from Single Instruction, Multiple Data (SIMD) fashion intersection of the query locations and photons.

The process is demonstrated in the example in Table 5.

TABLE 5

| idx | 0 | 1 | 2 | 3 | 4 | 5 | 6 | 7 | 8 | 9 | 10 | 11 |
|---|---|---|---|---|---|---|---|---|---|---|---|---|
| left | 0 | 0 | 1 | 0 | 1 | 1 | 1 | 0 | 1 | 1 | 0 | 1 |
| right | 1 | 0 | 1 | 1 | 0 | 0 | 0 | 1 | 1 | 0 | 1 | 1 |
| both | 1 | 0 | 2 | 1 | 1 | 1 | 1 | 1 | 2 | 1 | 1 | 2 |
| ⊕left | 0 | 0 | 0 | 1 | 1 | 2 | 3 | 4 | 4 | 5 | 6 | 6 |
| ⊕right | 0 | 1 | 1 | 2 | 3 | 3 | 3 | 3 | 4 | 5 | 5 | 6 |
| ⊕both | 0 | 1 | 1 | 3 | 4 | 5 | 6 | 7 | 8 | 10 | 11 | 12 |

As shown first, the index fields for left and right flags are created in two separate arrays. The corresponding exclusive prefix sums of these arrays are given by ⊕left and ⊕right. In practice, the prefix sums for the sum of left and right flags may not necessarily be stored, since ⊕both=⊕left+⊕right. The new size of the particle index array is given by the sum of all flags, which can be obtained in O(1) by ⊕both[11]+both[11]=12+2=14. The start offsets of the 4 child nodes are given similarly by elementary operations: 1) Start offset of first left child: 0; 2) Start offset of first right child: ⊕left[5]+left[5]=2+1=3; 3) Start offset of second left child: ⊕both[5]+both[5]=5+1=6; and 4) Start offset of second right child: ⊕left[11]+left[11]+⊕right[5]+right[5]=6+1+3+0=10

Using these start offsets, the target indices can be computed for all photons using the relative prefix sums within the nodes.

In order to support a locally varying radius in the algorithm of Table 4, lines 1 and 2, the algorithm may only need to be extended by segmented reduction with respect to the maximum operation on the query radii of the query locations in each node. The result of this operation may then be used for the assignments to the photons to the child nodes. As the maximum radius decreases, increasingly more unreferenced photons can be discarded because fewer query locations are taken into account.

Depending on the partitioning algorithm utilized, the hierarchy created may be highly unbalanced. Particles that are referenced by leaf nodes may no longer be needed during the hierarchical breadth-first intersection loop. However, the computation of the prefix sums and some memory operations may be done on the full particle index vectors. As the fraction of leaf nodes increases, this may become more and more wasteful. This can be remedied by a parallel compaction operation after every refinement step of all nodes of one level of the hierarchy, as disclosed in [Sengupta, 2007] and "Prefix Sums and their Applications" by G. Blelloch (*Synthesis of Parallel Algorithms*, J. Reif, Ed. Morgan Kaufmann, 1990).

In a first parallel sweep, all particles that belong to a leaf node are flagged with 1. Using exclusive prefix sums on this flag vector, leaf particles are appended to an array that is referenced accordingly by the leaf nodes. As the prefix sums of the negated flag vector can easily be deduced from the already generated prefix sums, no additional scan operation may be required for the actual compaction of the query location indices for every axis. A similar compaction operation may then be performed on the photon index vector.

Table 6 illustrates an exemplary algorithm for processing the leaf nodes. Again, it should be noted that such algorithm is set forth for illustrative purposes only, and should not be construed as limiting in any manner.

Table 6

Algorithm 5: Processing the leaf nodes.

```
// Loop over persistent blocks associated with leaves.
while (true) {
    if (tid == 0)
        // Fetch leaf id and load leaf.
    _syncthreads ( ) ;
    if (leaf_id > gridDim.x) return;
    // Loop over query location blocks.
    while (true) {
        // Compute query location block index interval.
        if (query location interval empty) break;
        bool process_query_pt = (s_begin + tid < s_end);
        float3 sum = make_float3( 0, 0, 0 ) ;
        if (process_query_pt) {
            // Load query location data into local memory.
        }
        // Loop over photon blocks.
        while (true) {
            // Compute photon block index interval.
            if (photon interval empty) break;
            // Load photon data in shared memory.
            syncthreads ( ) ;
            if (process_query_location) {
                for (p in photon index interval) {
                    // Check photon distance, evaluate BRDF &
                    // add result to sum.
                }
            }
        }
        result [ query_location_idx ] = sum;
    }
}
```

As described above, the choice of whether query locations or photons are partitioned may be arbitrary. However, partitioning the query locations may avoid memory write conflicts while computing photons contributions, because query locations may be uniquely associated to radiance estimates. For each leaf node E, all combinations of $N_p(E)$ photons with $N_s(E)$ query locations may have to be checked and evaluated. In order to minimize costly write operations to global memory, a thread may be assigned to each query locations. Assuming that the number of query locations is not greater than the block size, then each thread loops over all candidate photons, checks the intersection criteria depending on distance, surface normal as well as photon direction and eventually evaluates the bidirectional scattering distribution function (BSDF). These contributions are summed up and written to the result array.

If enough shared memory is available to be allocated for photon-related data, the kernel execution of each block may load this data at the beginning. As the loop over candidate photons is executed concurrently for all query location threads, and hence accesses the same shared memory entries, the photon queries may be very efficient.

In practice, the number of photons may not necessarily be bounded a priori, in particular in order to process high photon densities due to caustics. Furthermore, it may not always be desirable to restrict the number of query locations to be smaller than the block size. Denoting the shared memory for photons by $M_p$ and the block size by $M_s$ respectively, the input particles may be divided into $B_s:=\lceil N_s/M_s \rceil$ query location subblocks and $B_p:=\lceil N_p/M_p \rceil$ photon subblocks. For every query location subblock $i_s=0 \ldots B_s-1$ all photon subblocks $i_p=0, \ldots B_p-1$ may be looped through to compute the intersection contributions and add them up to the final result.

The threads may no longer be exclusively allocated to a query location, but assigned to a relative photon index within the photon subblock during the shared memory initialization. Hence, all threads may be kept alive. To achieve this, an additional flag may be used to mask out query location indices that are out of bounds. This also makes sure that thread synchronization succeeds.

Due to the fact that nearby query locations are querying photons in the same block, thread divergence may be reduced in the sense that all these query locations are combined with the same number of candidate photons and thus keep the threads alive for the same amount of time. As pointed out above, the payload per block may vary significantly depending on the split heuristic.

To this end, instead of performing individual lookups for a batch of query locations in parallel and summing up the photon contributions, the simultaneous propagation of query locations and photons in the hierarchy may exploit the fact that candidate query locations and photons may eventually overlap in the leaf nodes. Hence, as described above, the final intersection of individual particles may not necessarily suffer from divergence problems. In addition, the spatial coherence of the query locations may imply coherency and reduced divergence of the BSDF evaluation up to conditionals that depend on sample values.

Figure 2:
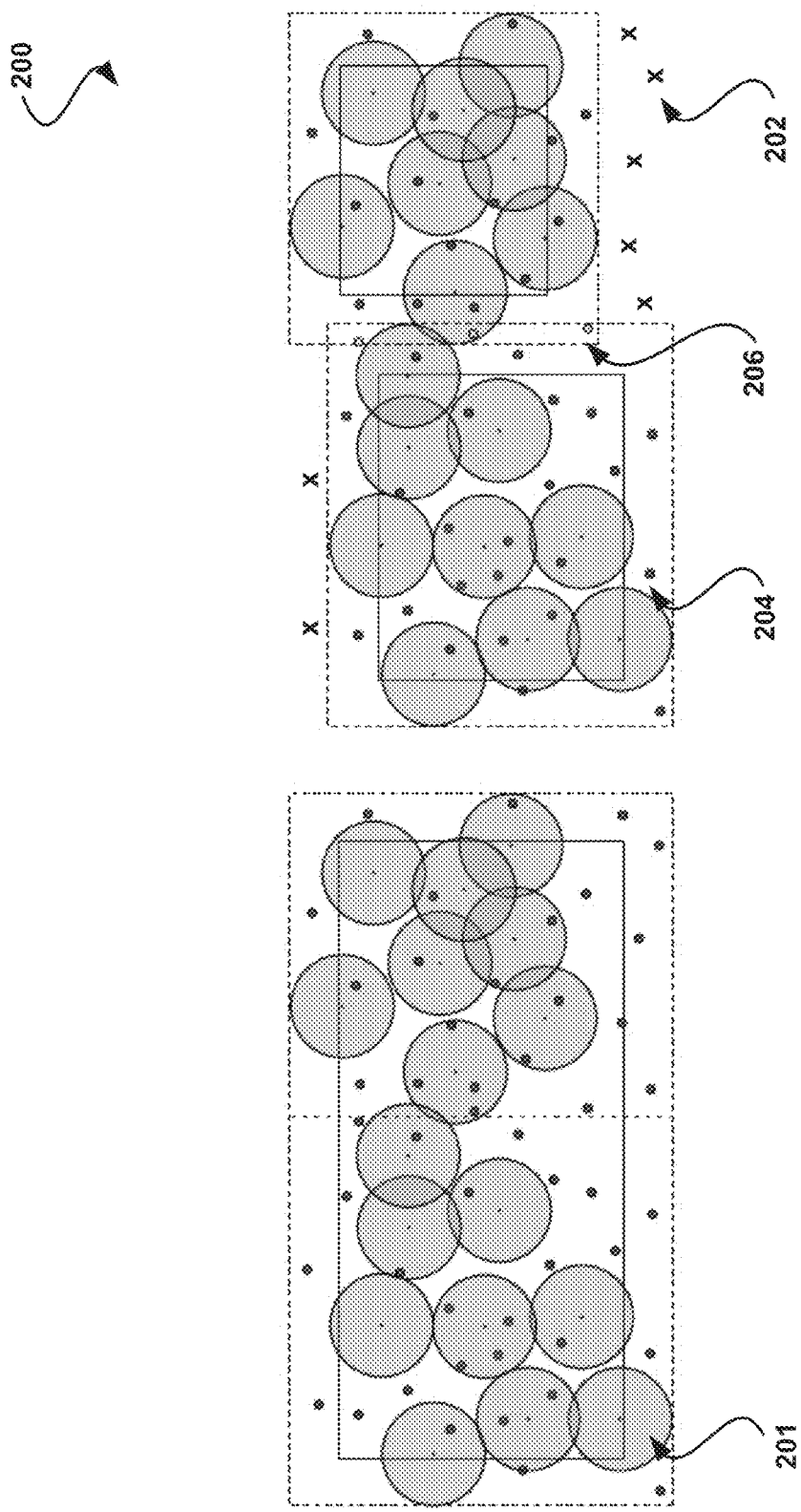
FIG. 2 illustrates a partitioning of query locations, in accordance with yet another embodiment.

FIG. 2 illustrates a partitioning 200 of query locations, in accordance with yet another embodiment. As an option, the present partitioning 200 may be implemented in the context of the functionality of FIG. 1. Of course, however, the partitioning 200 may be implemented in any desired environment. It should be noted that the aforementioned definitions may apply during the present description.

Instead of single photon map queries, a batch of range queries 201 (shown as the larger gray spheres centered at the smallest solid black dots) for photons 204 (shown as the larger solid black dots) may be executed simultaneously, as described above, which increases efficiency, because similar queries can share search results. In addition, partitioning the set of query locations on the left by a split plane allows for early discarding of photons (shown as the "x" 202) outside the resulting partitions (shown as the dashed boxes on the right). The photons 206 that need to be considered in both partitions are those that are within both of the partitions (shown as the smaller gray dots within both of the dashed boxes on the right).

Figure 3:
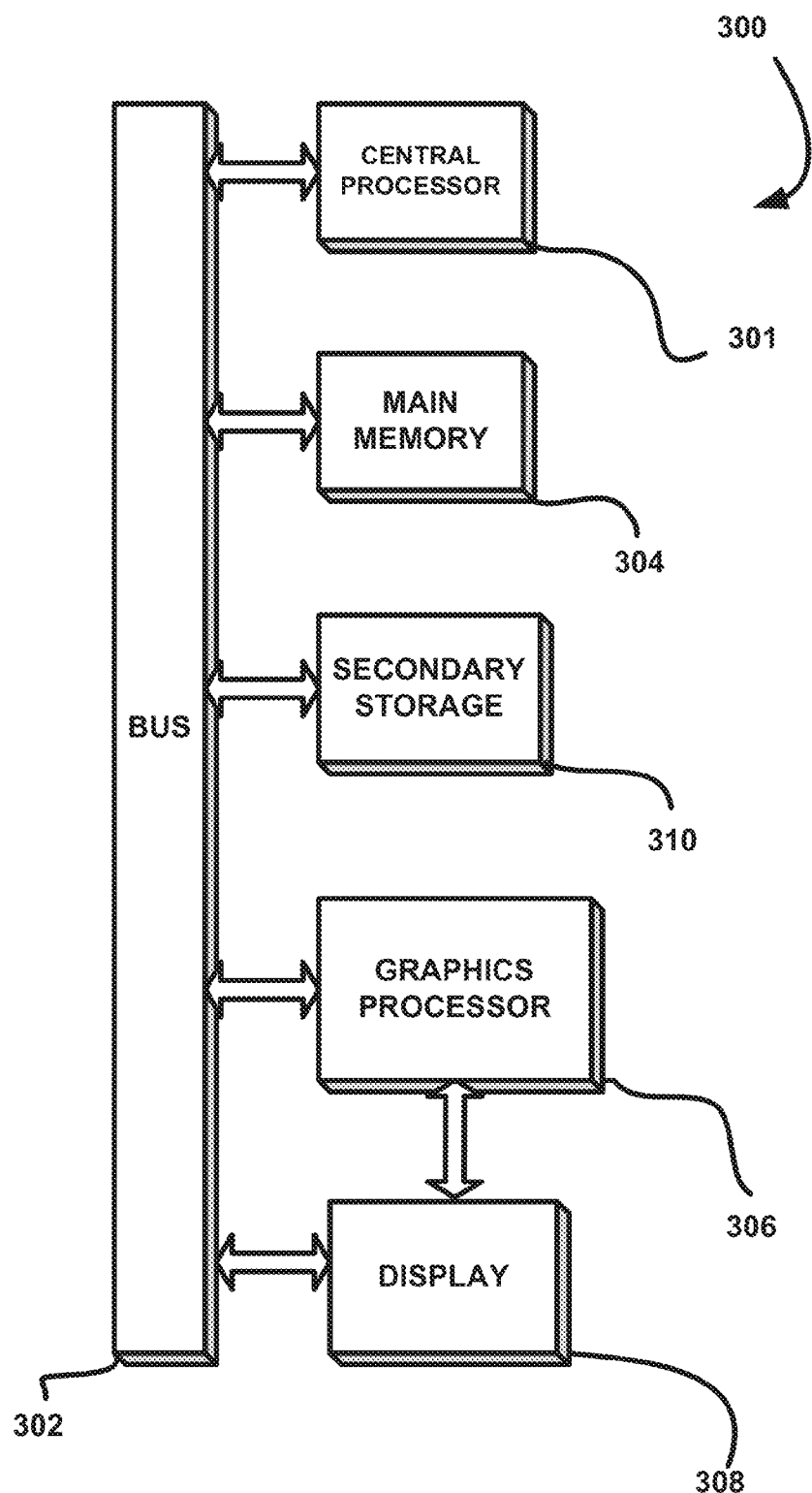
FIG. 3 illustrates an exemplary system in which the various architecture and/or functionality of the various previous embodiments may be implemented.

FIG. 3 illustrates an exemplary system 300 in which the various architecture and/or functionality of the various previous embodiments may be implemented. As shown, a system 300 is provided including at least one host processor 301 which is connected to a communication bus 302. The system 300 also includes a main memory 304. Control logic (software) and data are stored in the main memory 304 which may take the form of random access memory (RAM).

The system 300 also includes a graphics processor 306 and a display 308, i.e. a computer monitor. In one embodiment, the graphics processor 306 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system may as well be realized in reconfigurable logic, for example as using an FPGA (Field Programmable Gate Array).

The system 300 may also include a secondary storage 310. The secondary storage 310 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 304 and/or the secondary storage 310. Such computer programs, when executed, enable the system 300 to perform various functions. Memory 304, storage 310 and/or any other storage are possible examples of computer-readable media.

In one embodiment, the architecture and/or functionality of the various previous figures may be implemented in the context of the host processor 301, graphics processor 306, an integrated circuit (not shown) that is capable of at least a portion of the capabilities of both the host processor 301 and the graphics processor 306, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 300 may take the form of a desktop computer, lap-top computer, and/or any other type of logic. Still yet, the system 300 may take the form of various other devices m including, but not limited to a personal digital assistant (PDA) device, a mobile phone device, a television, etc.

Further, while not shown, the system 300 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
    computer code for:
        (a) generating photons and query locations;
        (b) determining a bounding volume of the query locations;
        (c) determining a set of the photons inside of the bounding volume;
        (d) determining whether the set of photons and the query locations meet a threshold including a number of query locations;
        (e) in response to a determination that the set of photons and the query locations meet the threshold including the number of query locations, computing a contribution of the set of photons to the query locations; and
        (f) in response to a determination that the set of photons or the query locations do not meet the threshold including the number of query locations:
            partitioning the query locations; and
            for each set of query locations resulting from the partitioning, repeating (b)-(f);
    wherein the computer program product is operable such that the query locations are partitioned according to a predetermined algorithm;
    wherein the computer program product is operable such that the predetermined algorithm includes sorting the query locations by x-axis, y-axis, and z-axis and partitioning the query locations according to a median of the sorted query locations.

2. The computer program product of claim 1, wherein the computer program product is operable such that each of the query locations is generated from a transport path emitted from a sensor.

3. The computer program product of claim 1, wherein the computer program product is operable such that each of the photons is generated by emitting the photons from a light source.

4. The computer program product of claim 1, wherein the threshold further includes at least one of a number of photons, and a depth of recursion.

5. The computer program product of claim 1, wherein the computer program product is operable such that the query locations are partitioned into at least two parts.

6. The computer program product of claim 1, wherein the computer program product is operable such that the repeating of (b)-(f) includes, at least in part, parallel processing.

7. The computer program product of claim 6, wherein the computer program product is operable such that each set of query locations resulting from the partitioning are processed in parallel.

8. The computer program product of claim 7, wherein the parallel processing is achieved by assigning each set of query locations resulting from the partitioning to a different computing unit.

9. The computer program product of claim 8, wherein the parallel processing performed in parallel includes the repetition of (b)-(f) for each set of query locations.

10. A computer program product embodied on a non-transitory computer readable medium, comprising:
 computer code for:
 (a) generating photons and query locations;
 (b) determining a bounding volume of the query locations;
 (c) determining a set of the photons inside of the bounding volume;
 (d) determining whether the set of photons and the query locations meet a threshold including a number of query locations;
 (e) in response to a determination that the set of photons and the query locations meet the threshold including the number of query locations, computing a contribution of the set of photons to the query locations; and
 (f) in response to a determination that the set of photons or the query locations do not meet the threshold including the number of query locations:
 partitioning the query locations; and
 for each set of query locations resulting from the partitioning, repeating (b)-(f);
 wherein the computer program product is operable such that the repeating of (b)-(f) includes, at least in part, parallel processing;
 wherein the computer program product is operable such that each set of query locations resulting from the partitioning are processed in parallel;
 wherein the parallel processing is achieved by assigning each set of query locations resulting from the partitioning to a different computing unit;
 wherein the parallel processing utilizes nodes each representative of one of the sets of query locations resulting from the partitioning, wherein each node stores an index interval of the represented set of query locations and an index interval of photons.

11. The computer program product of claim 10, wherein the computer program product is operable such that the parallel processing includes determining a split plane for each node and splitting the node into at least two parts according to the split plane determined for the node.

12. The computer program product of claim 11, wherein the computer program product is operable such that the parallel processing further includes assigning each of the at least two parts to an individual available thread block.

13. The computer program product of claim 12, wherein for each part of the at least two parts, each set of query locations included in the part is assigned to a thread, such that the at least two parts have corresponding sets of query locations assigned to different threads.

14. A method, comprising:
 (a) generating photons and query locations;
 (b) determining a bounding volume of the query locations;
 (c) determining a set of the photons inside of the bounding volume;
 (d) determining whether the set of photons and the query locations meet a threshold including a number of query locations;
 (e) in response to a determination that the set of photons and the query locations meet the threshold including the number of query locations, computing a contribution of the set of photons to the query locations; and
 (f) in response to a determination that the set of photons or the query locations do not meet the threshold including the number of query locations;
 partitioning the query locations; and
 for each set of query locations resulting from the partitioning, repeating (b)-(f);
 wherein the query locations are partitioned according to a predetermined algorithm;
 wherein the predetermined algorithm includes sorting the query locations by x-axis, y-axis, and z-axis and partitioning the query locations according to a median of the sorted query locations.

15. An apparatus, comprising:
 a processor for:
 (a) generating photons and query locations;
 (b) determining a bounding volume of the query locations;
 (c) determining a set of the photons inside of the bounding volume;
 (d) determining whether the set of photons and the query locations meet a threshold including a number of query locations;
 (e) in response to a determination that the set of photons and the query locations meet the threshold including the number of query locations, computing a contribution of the set of photons to the query locations; and
 (f) in response to a determination that the set of photons or the query locations do not meet the threshold including the number of query locations:
 partitioning the query locations; and
 for each set of query locations resulting from the partitioning, repeating (b)-(f);
 wherein the apparatus is operable such that the query locations are partitioned according to a predetermined algorithm;
 wherein the apparatus is operable such that the predetermined algorithm includes sorting the query locations by x-axis, y-axis, and z-axis and partitioning the query locations according to a median of the sorted query locations.

* * * * *